US012639151B2

(12) United States Patent
Chen et al.

(10) Patent No.: US 12,639,151 B2
(45) Date of Patent: May 26, 2026

(54) FUNCTIONAL SAFETY DISPLAY CONTROLLER AND FUNCTIONAL SAFETY DISPLAY CONTROL SYSTEM

(71) Applicant: VeriSilicon Microelectronics (Shanghai) Co., Ltd., Shanghai (CN)

(72) Inventors: Xiaoying Chen, Shanghai (CN); Huiming Zhang, Shanghai (CN); Kui Qin, Shanghai (CN); Cheng Chi, Shanghai (CN); Jianbing Wu, Shanghai (CN)

(73) Assignee: VeriSilicon Microelectronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/288,036

(22) PCT Filed: Dec. 29, 2022

(86) PCT No.: PCT/CN2022/143468
§ 371 (c)(1),
(2) Date: Oct. 23, 2023

(87) PCT Pub. No.: WO2024/138543
PCT Pub. Date: Jul. 4, 2024

(65) Prior Publication Data
US 2025/0315335 A1 Oct. 9, 2025

(51) Int. Cl.
*G06F 11/07* (2006.01)
*G06F 3/14* (2006.01)

(52) U.S. Cl.
CPC .............. *G06F 11/079* (2013.01); *G06F 3/14* (2013.01); *G06F 11/0736* (2013.01)

(58) Field of Classification Search
CPC .............. G06F 11/0751; G06F 11/079; G06F 11/0736; G06F 11/10; G06F 11/1004; G06F 11/22; G06F 3/14
See application file for complete search history.

(56) References Cited

U.S. PATENT DOCUMENTS

| | | | |
|---|---|---|---|
| 10,710,536 B1 * | 7/2020 | Hsu .......................... | B60R 21/01 |
| 2014/0173548 A1 | 6/2014 | Greb et al. | |

(Continued)

FOREIGN PATENT DOCUMENTS

| | | |
|---|---|---|
| CN | 109389407 A | 2/2019 |
| CN | 110045210 A | 7/2019 |
| CN | 110955571 A | 4/2020 |

(Continued)

*Primary Examiner* — Priyank J Shah
(74) *Attorney, Agent, or Firm* — IPRTOP LLC

(57) ABSTRACT

A functional safety display controller and a functional safety display control system are provided in the present disclosure. The functional safety display controller is connected to a central controller, a memory, and a display through communication lines, at least one internal module of the functional safety display controller is provided with a functional safety detection unit, and the functional safety detection unit is configured to detect random errors that occur in a corresponding module. The functional safety display controller, the central controller, the memory, and the display form the functional safety display control system, which can balance issues such as research and development costs, risk control, and system area overhead.

15 Claims, 2 Drawing Sheets

(56) References Cited

U.S. PATENT DOCUMENTS

| | | |
|---|---|---|
| 2015/0241553 A1 | 8/2015 | Gehrels et al. |
| 2019/0098327 A1 | 3/2019 | Marinelli et al. |

FOREIGN PATENT DOCUMENTS

| | | | |
|---|---|---|---|
| CN | 111806461 A | 10/2020 | |
| CN | 112567343 A | 3/2021 | |
| CN | 113608914 A | 11/2021 | |
| CN | 114968781 A | 8/2022 | |
| DE | 102016213640 A1 | 2/2018 | |

* cited by examiner

FUNCTIONAL SAFETY DISPLAY CONTROLLER AND FUNCTIONAL SAFETY DISPLAY CONTROL SYSTEM

TECHNICAL FIELD

The present disclosure relates to the technical field of functional safety, to functional safety display control, and in particular, to a functional safety display controller and a functional safety display control system.

BACKGROUND

Functional Safety (Fusa) refers to reducing the risk of a system so that safe operation can be realized in the event of electrical or electronic failures. As more and more products incorporate complex microelectronics and software in their design, assessing and implementing functional safety at the system level becomes increasingly challenging. In the field of automotive safety, ISO26262 sets international standards for improving the functional safety of automotive electronic products. A display control system is an indispensable part of a vehicle system. With the rapid development of intelligent driving, the display control system of the vehicle system has become more complex and the degree of electrification has increased. Therefore, real-time detection and reporting of circuit abnormalities have become an urgent need for the display control system of the vehicle system.

Due to the continuous updating and improvement of the ISO26262 standard, automotive functional safety technology is still developing. Traditional functional safety display control systems require the participation of both software and hardware to meet functional safety standards, for example, software generates a software test library (STL), hardware responds to the STL and executes it, and a comparison circuit of the hardware compares an execution result of the STL with an expected result to detect permanent errors in a circuit. Software test sequences require software developers to manage the switching between functional safety test sequences and regular display configuration commands to achieve detection during normal display. The above method has high performance requirements for the traditional functional safety display control systems and real-time detection effects are not ideal. Furthermore, it also greatly increases the complexity of the traditional functional safety display control systems. In addition, the STL itself needs to be certified by the ISO26262 standard. Compared with ordinary display control systems, the traditional functional safety display control systems require more than 6-8 times the product development cycle, and the simultaneous large-scale changes in software and hardware also greatly increase system risk.

Another type of functional safety display control system does not require software participation in certification, and only hardware participation is required. The type of functional safety display control system can reduce research and development investment and shorten the research and development cycle. Compared with ordinary display control systems, although the type of functional safety display controller system requires more than 3-4 times the product development cycle, it can detect random errors caused by electronic and electrical faults in an internal hardware circuit through simple replication of the large-grain level internal modules and comparison circuits. Compared to circuits without functional safety, this type of functional safety display controller system requires 2-2.5 times the area overhead.

In summary, how to design a functional safety display control system that can meet ISO26262 standard certification while ensuring that research and development risks are controllable, shortening the research and development cycle, and reducing the investment of research and development personnel has become one of the difficult problems that technical personnel in the field urgently need to solve.

SUMMARY

The present disclosure provides a functional safety display controller and a functional safety display control system, which aims to solve problems in the related art, such as, display control systems that meet the ISO26262 standard have difficulty in balancing research and development costs, risk control, and system area overhead.

A first aspect of the present disclosure provides the functional safety display controller. The functional safety display controller is connected to a central controller, a memory, and a display through communication lines, wherein at least one internal module of the functional safety display controller is provided with a corresponding functional safety detection unit, and the functional safety detection unit is configured to detect random errors that occur in a corresponding internal module.

In an embodiment of the first aspect of the present disclosure, the functional safety display controller includes a register parsing module, and the register parsing module is provided with a first functional safety detection unit and a second functional safety detection unit, wherein the first functional safety detection unit is configured to detect random errors occurring in interfaces of the central controller and the functional safety display controller, and detect random errors occurring in configuration data of the functional safety display controller and an internal use terminal, wherein the second functional safety detection unit is configured to detect random errors occurring in a control circuit between the central controller and the functional safety display controller.

In an embodiment of the first aspect of the present disclosure, the first functional safety detection unit detects the random errors occurring in the interfaces of the central controller and the functional safety display controller and detects the random errors occurring in the configuration data of the functional safety display controller and the internal use terminal by performing parity check on contents transmitted by a configuration bus, and/or wherein the second functional safety detection unit detects the random errors occurring in the control circuit between the central controller and the functional safety display controller by monitoring a timeout situation of the configuration bus.

In an embodiment of the first aspect of the present disclosure, the functional safety display controller includes an image processing module, and the image processing module is provided with a third functional safety detection unit, a fourth functional safety detection unit, and a fifth functional safety detection unit, wherein the third functional safety detection unit is configured to detect random errors occurring in data information of pipelines inside the functional safety display controller, wherein the fourth functional safety detection unit is configured to detect random errors occurring in a combination circuit among the pipelines inside the functional safety display controller, wherein the fifth functional safety detection unit is configured to detect permanent circuit errors occurring in the functional safety display controller.

In an embodiment of the first aspect of the present disclosure, the third functional safety detection unit detects the random errors occurring in the data information of the pipelines inside the functional safety display controller by performing parity check on a timing circuit, and/or wherein the fourth functional safety detection unit detects the random errors occurring in the combination circuit among the pipelines inside the functional safety display controller by taking each stage of the pipeline as the smallest unit, and/or wherein the fifth functional safety detection unit detects the permanent circuit errors occurring in the functional safety display controller through a hardware test library.

In an embodiment of the first aspect of the present disclosure, the functional safety display controller includes a display interface control module, and the display interface control module is provided with a sixth functional safety detection unit, a seventh functional safety detection unit, and an eighth functional safety detection unit, wherein the sixth functional safety detection unit is configured to detect permanent circuit errors occurring in the functional safety display controller, wherein the seventh functional safety detection unit is configured to detect random errors occurring in a pixel pipeline control circuit inside the functional safety display controller, wherein the eighth functional safety detection unit is configured to detect random errors occurring in display data between the functional safety display controller and the display.

In an embodiment of the first aspect of the present disclosure, the sixth functional safety detection unit detects the permanent circuit errors occurring in the functional safety display controller through a hardware test library, and/or wherein the seventh functional safety detection unit detects the random errors occurring in the pixel pipeline control circuit inside the functional safety display controller by monitoring the number of pixels, and/or wherein the eighth functional safety detection unit detects the random errors occurring in the display data between the functional safety display controller and the display by performing cyclic redundancy check encoding on pixel contents at a sending end.

In an embodiment of the first aspect of the present disclosure, the functional safety display controller includes a memory access control module, and the memory access control module is provided with a ninth functional safety detection unit, a tenth functional safety detection unit, an eleventh functional safety detection unit, and a twelfth functional safety detection unit, wherein the ninth functional safety detection unit detects permanent circuit errors occurring in the functional safety display controller, wherein the tenth functional safety detection unit detects random errors occurring in a pixel transfer data path between the functional safety display controller and the memory, wherein the eleventh functional safety detection unit and the twelfth functional safety detection unit detect random errors occurring in a control path between the functional safety display controller and the memory.

In an embodiment of the first aspect of the present disclosure, the ninth functional safety detection unit detects the permanent circuit errors occurring in the functional safety display controller through a hardware test library, and/or wherein the tenth functional safety detection unit detects the random errors occurring in the pixel transfer data path between the functional safety display controller and the memory by performing cyclic redundancy check decoding on data contents of a data bus at a receiving end, and/or wherein the eleventh functional safety detection unit detects the random errors occurring in the control path between the functional safety display controller and the memory by monitoring a timeout situation of the data bus, and/or wherein the twelfth functional safety detection unit detects the random errors occurring in the control path between the functional safety display controller and the memory by monitoring a data bus protocol.

In an embodiment of the first aspect of the present disclosure, the functional safety display controller includes an internal storage module, and the internal storage module is provided with a thirteenth functional safety detection unit, wherein the thirteenth functional safety detection unit is configured to detect circuit random errors occurring in the internal storage module.

In an embodiment of the first aspect of the present disclosure, the thirteenth functional safety detection unit detects the circuit random errors occurring in the internal storage module by using error correcting code.

In an embodiment of the first aspect of the present disclosure, the functional safety display controller further includes an interrupt control module, and permanent errors and/or temporary errors detected by the functional safety detection unit is reported to the central controller in a form of interrupts through the interrupt control module.

In an embodiment of the first aspect of the present disclosure, the interrupt control module includes a fourteenth functional safety detection unit, wherein the fourteenth functional safety detection unit is configured to detect and correct circuit random errors occurring in a functional safety interrupt path.

In an embodiment of the first aspect of the present disclosure, the fourteenth functional safety detection unit detects and corrects the circuit random errors occurring in the functional safety interrupt path by using triple modular redundancy.

In an embodiment of the first aspect of the present disclosure, the functional safety detection unit is further configured to detect random errors occurring in a configuration bus between the functional safety display controller and the central controller, random errors occurring in an image data bus between the functional safety display controller and the memory, and/or random errors occurring in a display data bus between the functional safety display controller and the display.

A second aspect of the present disclosure provides a functional safety display control system. The functional safety display control system includes the central controller, the memory, the display, and the functional safety display controller described in any one of the first aspect of the present disclosure.

As mentioned above, in the present disclosure, the functional safety display controller is communicatively connected to the central controller, the memory, and the display, and the functional safety display control system includes the functional safety display controller, the central controller, the memory, and the display. The functional safety display control system is in a form of hardware that complies with the ISO26262 standard and can balance issues such as research and development costs, risk control, and system area overhead.

In addition, in some embodiments of the present disclosure, the functional safety display controller can adopt corresponding functional safety detection mechanism according to the function and type of the circuit, and its area overhead is controllable. Therefore, the functional safety display controller provided by the present disclosure is an inheritable and expandable solution.

Furthermore, in some embodiments of the present disclosure, the functional safety display control system including the functional safety display controller, the central controller, the memory, and the display does not require software certification, and can detect and report random errors caused by electronic and electrical failures in circuits in real time. With higher real-time performance, safety, and reliability, it can greatly reduce product research and development costs, accelerate product research and development progress, and reduce development risks. Compared with ordinary display control systems, the functional safety display control system only needs 1.2~1.4 times the area overhead to detect more than 90% of circuit random errors.

REFERENCE NUMERALS

Figure 1:
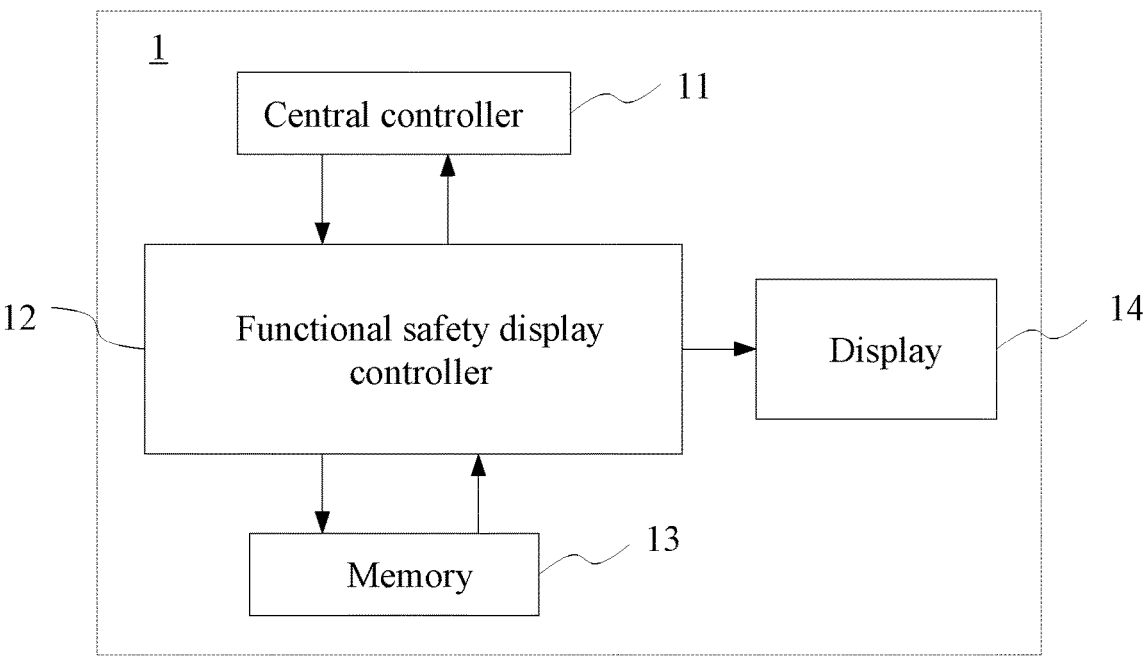
FIG. 1 shows a schematic structural diagram of a functional safety display control system according to an embodiment of the present disclosure.

| | |
|---|---|
| 1 | Functional safety display control system |
| 11 | Central controller |
| 12 | Functional safety display controller |
| 121 | Register parsing module |
| 1211 | Register parsing unit |
| 122 | Image processing module |
| 1221 | Image processing unit |
| 123 | Display interface control module |
| 1231 | Display interface control unit |
| 124 | Memory access control module |
| 1241 | Memory access control unit |
| 125 | Internal storage module |
| 1251 | Internal storage unit |
| 126 | Interrupt control module |
| 1261 | Interrupt control unit |
| 13 | Memory |
| 14 | Display |
| Fusa01 | First functional safety detection unit |
| Fusa02 | Second functional safety detection unit |
| Fusa03 | Third functional safety detection unit |
| Fusa04 | Fourth functional safety detection unit |
| Fusa05 | Fifth functional safety detection unit |
| Fusa06 | Sixth functional safety detection unit |
| Fusa07 | Seventh functional safety detection unit |
| Fusa08 | Eighth functional safety detection unit |
| Fusa09 | Ninth functional safety detection unit |
| Fusa10 | Tenth functional safety detection unit |
| Fusa11 | Eleventh functional safety detection unit |
| Fusa12 | Twelfth functional safety detection unit |
| Fusa13 | Thirteenth functional safety detection unit |
| Fusa14 | Fourteenth functional safety detection unit |

DETAILED DESCRIPTION

The present disclosure will be described below through specific examples. Those skilled in the art can easily understand other advantages and effects of the present disclosure according to contents disclosed in the specification. The present disclosure may also be implemented or applied through other different embodiments, and various modifications or changes may be made to all details in the specification based on different points of view and applications without departing from the spirit of the present disclosure. It should be noted that the following embodiments and the features in the embodiments can be combined with each other under no conflict condition.

It should be noted that the drawings provided herein only exemplify the basic idea of the present disclosure. Only components closely related to the present disclosure are shown in the drawings, and they are not necessarily drawn according to the quantities, shapes, and sizes of the components during actual implementation. During actual implementation, the patterns, quantities, and proportions of the components may be changed as needed, and the layout of the components may also be more complicated.

The following embodiments of the present disclosure provide a functional safety display control system. FIG. 1 is a schematic diagram of a hardware architecture of the functional safety display control system 1 according to an embodiment of the present disclosure. As shown in FIG. 1, the functional safety display control system 1 provided by the present disclosure includes a central controller 11, a functional safety display controller 12, a memory 13, and a display 14. The functional safety display controller 12 is communicatively connected to the central controller 11, the memory 13, and the display 14 through communication lines.

The central controller 11 is configured to send a display configuration command from a display controller driver to the functional safety display controller 12, and receive and process interrupt information from the functional safety display controller 12.

The functional safety display controller 12 is configured to receive a configuration command from the central controller 11, read image data from the memory 13, perform image processing on the image data to generate a standard display interface signal, and send the standard display interface signal to the display 14, wherein the standard display interface signal includes image information and control information.

The memory 13 is configured to store the image data to be read by the functional safety display controller 12. In an embodiment of the present disclosure, the memory 13 may be, for example, a random access memory, a read-only memory, a flash memory, a hard disk, a solid state hard disk, a magnetic tape, a floppy disk, an optical disc and any combination thereof.

The display 14 is configured to receive the image information and the control information from the functional safety display controller 12 and display them on a display screen.

In an embodiment of the present disclosure, the functional safety display controller 12 includes at least one internal module. The at least one internal module is provided with a functional safety detection unit, and the functional safety detection unit is configured to detect random errors occurring in a corresponding internal module and report them to a functional safety interrupt. The internal module may be, for example, a register parsing module, an image processing module, a display interface control module, and a memory access control module, etc.

Optionally, some or all of the functional safety detection units are further configured to detect random errors occurring in a configuration bus between the functional safety display controller 12 and the central controller 11, random errors occurring in an image data bus between the functional safety display controller 12 and the memory 13, and/or random errors occurring in a display data bus between the functional safety display controller 12 and the display 14.

Specifically, the configuration bus between the functional safety display controller 12 and the central controller 11 can detect random errors occurring in a circuit in real time through corresponding functional safety detection units. The image data bus between the functional safety display controller 12 and the memory 13 can detect random errors occurring in the circuit through corresponding functional safety detection units. The display data bus between the functional safety display controller 12 and the display 14 can detect random errors occurring in the circuit through corresponding functional safety detection units.

Figure 2:
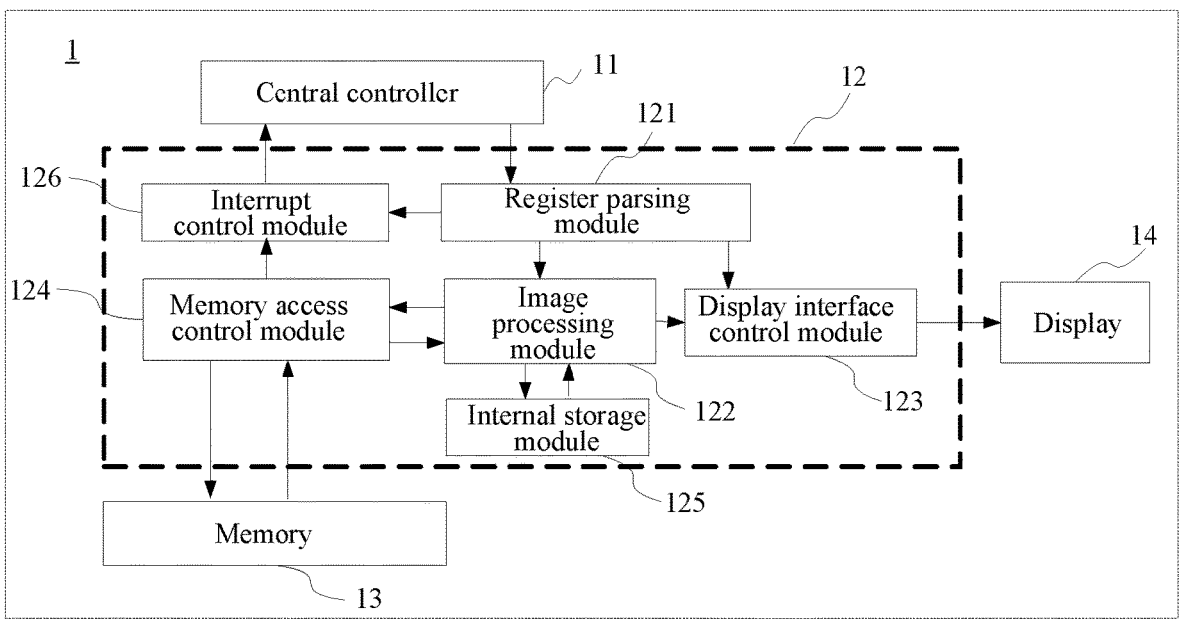
FIG. 2 shows a schematic structural diagram of a functional safety display control system according to an embodiment of the present disclosure.
Figure 3:
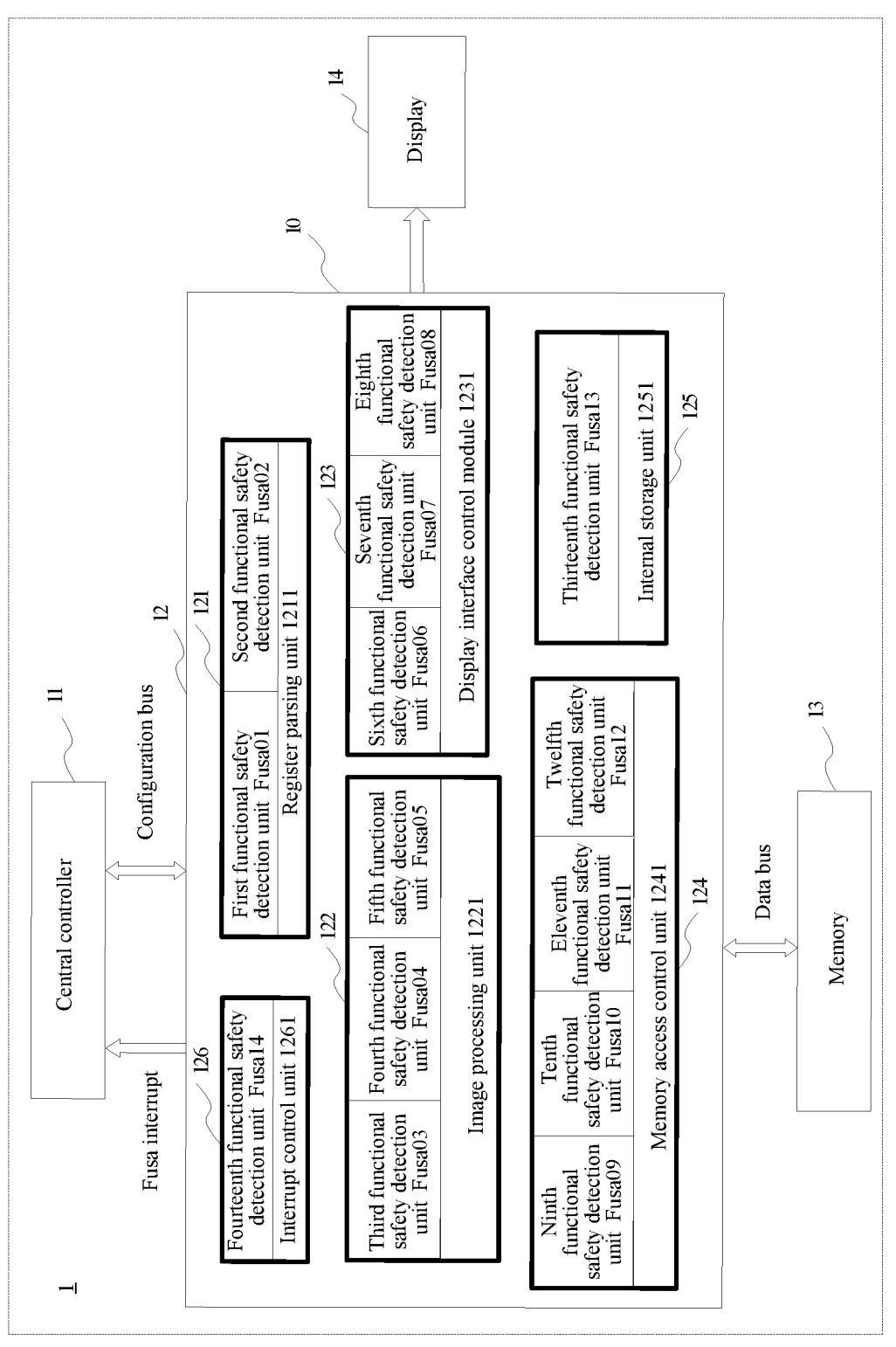
FIG. 3 shows a schematic structural diagram of a functional safety display control system according to an embodiment of the present disclosure.

FIG. 2 is a detailed schematic structural diagram of the functional safety display control system 1 according to an embodiment of the present disclosure. FIG. 3 is an internal structural schematic diagram of the functional safety display control system 1 according to an embodiment of the present disclosure. As shown in the above figures, in an embodiment of the present disclosure, the functional safety display controller 12 includes the register parsing module 121, the register parsing module 121 includes a register parsing unit 1211, a first functional safety detection unit Fusa01, and a second functional safety detection unit Fusa02.

The first functional safety detection unit Fusa01 is configured to detect random errors occurring in interfaces of the central controller 11 and the functional safety display controller 12, and detect random errors occurring in the functional safety display controller 12 and an internal use terminal.

In some embodiments, the first functional safety detection unit Fusa01 detects random errors occurring in the configuration bus of the central controller 11 and the functional safety display controller 12 and detects the random errors occurring in the functional safety display controller 12 and the internal use terminal by performing parity check on contents transmitted by the configuration bus. It should be noted that the division of the functional safety detection units corresponding to each module in FIG. 3 is only a logical functional division, and in actual implementation, the functional safety detection units can be fully or partially integrated into a single physical entity, or physically separated. For example, in an embodiment of applying the first functional safety detection unit Fusa01, for parity check detection of the configuration bus, a configuration bus path inside the hardware is divided into N segments by adopting a segmented detection method, so that configuration paths related to other units or modules inside the hardware will be detected, wherein N is a positive integer greater than or equal to 1. Each sub-path separately detects parity check bits from a sending end to a receiving end, and any functional safety parity check error occurring in any sub-path will be sent to the functional safety display interrupt of the functional safety display controller 12.

The second functional safety detection unit Fusa02 is configured to detect random errors occurring in a control circuit between the central controller 11 and the functional safety display controller 12.

In some embodiments, the second functional safety detection unit Fusa02 detects the random errors occurring in the control circuit between the central controller 11 and the functional safety display controller 12 by monitoring a timeout situation of the configuration bus. In an embodiment, when a read/write request from the central controller 11 is successfully received, a counter (which is used for monitoring whether a bus is accessed) inside the second functional safety detection unit Fusa02 starts counting, and the counter is cleared when feedback information (i.e., ack) from a request destination is successfully received. If a count value of the counter exceeds a preset threshold, a monitoring circuit of the second functional safety detection unit Fusa02 will send an access timeout error interrupt to the functional safety interrupt of the functional safety display controller 12.

According to the above description, in an embodiment of the present disclosure, it can be seen that the register parsing module 121 can detect random errors occurring in the circuit through the first and second functional safety detection units, i.e. Fusa01 and Fusa02. In addition, the configuration path between the central controller 11 and the functional safety display controller 12 can also detect random errors occurring in the circuit through the first and second functional safety detection units, i.e. Fusa01 and Fusa02.

It should be noted that the register parsing module 121 including both the first functional safety detection unit Fusa01 and the second functional safety detection unit Fusa02 is one feasible way of the present disclosure, and the present disclosure is not limited thereto. In other embodiments, the register parsing module 121 may only include the first functional safety detection unit Fusa01 or the second functional safety detection unit Fusa02.

In an embodiment of the present disclosure, the functional safety display controller 12 also includes the image processing module 122. The image processing module 122 obtains image data information through the memory access control module 124, performs image processing on the image data information to generate pixel data, and sends the pixel data to the display interface control module 123. Referring to FIG. 3, in an embodiment of the present disclosure, the image processing module 122 includes an image processing unit 1221, a third functional safety detection unit Fusa03, a fourth functional safety detection unit Fusa04, and a fifth functional safety detection unit Fusa05.

The third functional safety detection unit Fusa03 is configured to detect random errors occurring in data information of pipelines inside the functional safety display controller 12.

In an embodiment, the third functional safety detection unit Fusa03 detects the random errors occurring in the data information of the pipelines inside the display controller 12 by performing parity check on a timing circuit. Specifically, the third functional safety detection unit Fusa03 is mainly configured to protect the image processing unit 1221. The image processing unit 1221 mainly performs post-processing operations on original images stored in the memory 13, wherein the post-processing operations include but are not limited to one or more of the following operations: format conversion, image scaling, inversion, blending, gamut mapping, tone mapping, blurring, etc. These image processing operations are based on a pipeline implementation mechanism, where each stage of the pipeline performs different operations and latches to the next stage of the pipeline. The data information of each stage of the pipeline detects random errors occurring in the circuit by the third functional safety detection unit Fusa03.

It should be noted that the data information of the pipelines can be implemented through a storage unit, and the storage unit includes but is not limited to a register, a first-in-first-out (FIFO) memory, etc.

The fourth functional safety detection unit Fusa04 is configured to detect random errors occurring in a combination circuit among pipelines inside the functional safety display controller 12.

In some embodiments, the fourth functional safety detection unit Fusa04 is mainly configured to protect the image processing unit 1221. Based on considerations of the area and the operating speed, the transformations (which include but are not limited to matrix multiplication, interpolation operations, filtering operations, linear transformations, etc.) of an image processor require one or more stages of pipelines to complete. In an embodiment of the present disclosure, the fourth functional safety detection unit Fusa04 takes each stage of the pipeline as the smallest unit for protection. Specifically, a comparison circuit of the fourth functional safety detection unit Fusa04 compares a value of a backup circuit with a value of an original functional circuit. If the value of the backup circuit does not match with the value of the original function circuit, the fourth functional safety detection unit Fusa04 sends an error interrupt to the functional safety interrupt of the functional safety display controller 12.

It should be noted that, the fourth functional safety detection unit Fusa04 taking each stage of the pipeline as the protection granularity is one feasible way of the present disclosure, and the present disclosure is not limited thereto. In other embodiments, according to the operation difficulty and area target, the protection granularity of some pipelines can also be the sub-module level.

The fifth functional safety detection unit Fusa05 is configured to detect permanent circuit errors occurring in the functional safety display controller 12.

In some embodiments, the fifth functional safety detection unit Fusa05 detects the permanent circuit errors occurring in the functional safety display controller 12 through a hardware test pattern generator (TPG), which is also known as a hardware test library (HTL). The HTL is a hardware-defined and generated test sequence that maximizes the coverage of hardware logic. The fifth functional safety detection unit Fusa05 can detect the permanent errors occurring during power-up and normal display through HTL. Specifically, a HTL mode of the functional safety display controller 12 can be started by a specific command. In an embodiment of the present disclosure, the HTL can be started during system power-up to detect random circuit errors caused by electronic erroneous flips in the system as early as possible. When an abnormality is detected in the circuit, the functional safety display controller 12 can report an error interrupt in real time. In other embodiments, the HTL can also be started during normal display of the system, and the hardware maintains the HTL and display the output data and control flow.

It should be understood that the image processing module 122 including the third functional safety detection unit Fusa03, the fourth functional safety detection unit Fusa04, and the fifth functional safety detection unit Fusa05 is one feasible way of the present disclosure, and the present disclosure is not limited thereto. In other embodiments, the image processing module 122 may include one or two of the third functional safety detection unit Fusa03, the fourth functional safety detection unit Fusa04, and the fifth functional safety detection unit Fusa05.

In an embodiment of the present disclosure, the functional safety display controller 12 includes the display interface control module 123, and the display interface control module 123 receives configuration information from the register parsing module 121 and pixel data information from the image processing module 122, generates standard display interface data, and sends the standard display interface data to the display 14. Referring to FIG. 3, in an embodiment of the present disclosure, the display interface control module 123 includes a display interface control unit 1231, a sixth functional safety detection unit Fusa06, a seventh functional safety detection unit Fusa07, and an eighth functional safety detection unit Fusa08.

The sixth functional safety detection unit Fusa06 is configured to detect permanent circuit errors occurring in the functional safety display controller 12. In an embodiment of the present disclosure, the function and implementation of the sixth functional safety detection unit Fusa06 are similar to those of the fifth functional safety detection unit Fusa05, which will not be described in detail herein.

The seventh functional safety detection unit Fusa07 is configured to detect random errors occurring in a pixel pipeline control circuit inside the functional safety display controller 12.

In some embodiments, the seventh functional safety detection unit Fusa07 detects the random errors occurring in the pixel pipeline control circuit inside the functional safety display controller 12 by monitoring the number of pixels. Specifically, the seventh functional safety detection unit Fusa07 obtains the total number of desired pixels by using the configuration data that passes the detection of the first functional safety detection unit Fusa01 and the second functional safety detection unit Fusa02. The seventh functional safety detection unit Fusa07 defines M monitoring points in hardware, wherein M is a positive integer greater than or equal to 1. It should be noted that M equals 1, as shown in FIG. 3, is one feasible way of the present disclosure, and the present disclosure is not limited thereto. In other embodiments, multiple monitoring points for monitoring the number of pixels can be defined according to the division of circuit functions. The seventh functional safety detection unit Fusa07 detects and counts the number of pixels at a specified monitoring point. At the next time point after the end of one frame, the comparison circuit inside the seventh functional safety detection unit Fusa07 compares an actual value with an expected value. If the actual value does not match with the expected value, the seventh functional safety detection unit Fusa07 sends a pixel number error interrupt to the functional safety interrupt of the functional safety display controller 12.

The eighth functional safety detection unit Fusa08 is configured to detect random errors occurring in display data between the functional safety display controller 12 and the display 14.

In some embodiments, the eighth functional safety detection unit Fusa08 detects the random errors occurring in the display data between the functional safety display controller 12 and the display 14 by performing cyclic redundancy check encoding on pixel contents at a sending end, wherein the polynomial of cyclic redundancy check encoding needs to be uniformly defined between the functional safety display controller 12 and the display 14, and the definition method is not limited herein. The display interface control module 123 performs cyclic redundancy check encoding on each valid data sent to an interface, wherein the cyclic redundancy check coding is in units of rows or frames. The values of the cyclic redundancy encoding of a data block can be transmitted in various ways. For example, the values of the cyclic redundancy encoding can be sent to the display 14 in real time by a time-division multiplexed display data bus, and the time-division multiplexed display data bus includes but is not limited to a display port (DP) or a display pixel interface (DPI). In other embodiments, the values of the cyclic redundancy encoding can be stored in an internal register, and software can obtain the values of the cyclic redundancy encoding by reading the register.

It should be noted that the display interface control module 123 including the sixth functional safety detection unit Fusa06, the seventh functional safety detection unit Fusa07, and the eighth functional safety detection unit Fusa08 is one feasible way of the present disclosure, and the present disclosure is not limited thereto. In other embodiments, the display interface control module 123 may include one or two of the sixth functional safety detection unit Fusa06, the seventh functional safety detection unit Fusa07, and the eighth functional safety detection unit Fusa08.

In an embodiment of the present disclosure, the functional safety display controller 12 includes the memory access control module 124, wherein the memory access control module 124 reads image data from the memory 13 through a data bus and stores the image data returned by the memory 13 in an internal storage module 125. Referring to FIG. 3, in an embodiment of the present disclosure, the memory access control module 124 includes a memory access control unit 1241, a ninth functional safety detection unit Fusa09, a tenth functional safety detection unit Fusa10, an eleventh functional safety detection unit Fusa11, and a twelfth functional safety detection unit Fusa12.

The ninth functional safety detection unit Fusa09 detects permanent circuit errors occurring in the functional safety display controller through a hardware test library. In an embodiment of the present disclosure, the function and implementation of the ninth functional safety detection unit Fusa09 are similar to those of the fifth functional safety detection unit Fusa05, which will not be described in detail herein.

The tenth functional safety detection unit Fusa10 detects random errors occurring in a pixel transfer data path between the functional safety display controller 12 and the memory 13.

In some embodiments, the tenth functional safety detection unit Fusa10 detects the random errors occurring in the pixel transfer data path between the functional safety display controller 12 and the memory 13 by performing cyclic redundancy check decoding on data contents of a data bus at a receiving end. It should be noted that the memory access control unit 1241 acts as a receiver, and its polynomial for cyclic redundancy check encoding and the size of its encoded data block need to be uniformly defined at the system level. In an embodiment of the present disclosure, according to the per-frame operation attributes of the functional safety display controller 12, the maximum size of a data block is the size of an entire image.

The eleventh functional safety detection unit Fusa11 is configured to detect random errors occurring in the control path between the functional safety display controller 12 and the memory 13 by monitoring a timeout situation of the data bus.

In some embodiments, the eleventh functional safety detection unit Fusa11 defines two monitoring points, wherein a first monitoring point is at the source of a sending end and a second monitoring point is at the I/O interface between the functional safety display controller 12 and the memory 13. The eleventh functional safety detection unit Fusa11 sets a first counter 1 and a second counter 2 at the two monitoring points respectively. When each monitoring point receives a read request, the corresponding counter performs an incrementing operation. The eleventh functional safety detection unit Fusa11 also monitors the amount of data returned from the I/O, and the amount of data can be represented by a third counter 3. After one frame ends, the comparison circuit of the eleventh functional safety detection unit Fusa11 compares the counting values of the first, second, third counters 1, 2, and 3. If any two of the counting values are not equal to each other, the eleventh functional safety detection unit Fusa11 sends a control path error interrupt to the functional safety interrupt of the functional safety display controller 12.

The twelfth functional safety detection unit Fusa12 is configured to detect the random errors occurring in the control path between the functional safety display controller 12 and the memory 13 by monitoring a data bus protocol.

In some embodiments, the twelfth functional safety detection unit Fusa12 can define scenarios that violate the bus protocol according to the bus protocol. If any violation of the bus protocol is detected, the twelfth functional safety detection unit Fusa12 sends a control path error interrupt to the functional safety interrupt of the functional safety display controller 12.

In an embodiment of the present disclosure, the functional safety display controller 12 includes the internal storage module 125, wherein the internal storage module 125 is configured to store image data read from the memory 13. Referring to FIG. 3, in an embodiment of the present disclosure, the internal storage module 125 includes an internal storage unit 1251 and a thirteenth functional safety detection unit Fusa13. The thirteenth functional safety detection unit Fusa13 is configured to detect circuit random errors occurring in the internal storage module.

In some embodiments, the thirteenth functional safety detection unit Fusa13 can protect the internal storage unit 1251 through error correcting code (ECC).

In an embodiment of the present disclosure, the functional safety display controller 12 includes an interrupt control module 126. Permanent errors and temporary errors detected by the functional safety detection units are reported to the central controller 11 through the interrupt control module 126.

Optionally, in an embodiment of the present disclosure, the interrupt control module 126 includes an interrupt control unit 1261 and a fourteenth functional safety detection unit Fusa14. The fourteenth functional safety detection unit Fusa14 is configured to detect and correct circuit random errors occurring in a functional safety interrupt path.

In some embodiments, in view of the higher severity caused by circuit random errors occurring in the interrupt control unit 1261, the fourteenth functional safety detection unit Fusa14 detects and corrects circuit random errors occurring in the functional safety interrupt path through triple modular redundancy protection. Specifically, triple modular redundancy generates two identical modules based on the modules to be reinforced and outputs them through majority voting, so as to ensure that the circuit can still work normally even if one module fails, thereby greatly reducing the impact of random errors generated by the interrupt circuit itself and enhancing the reliability of the system.

According to the above description, it can be seen that the functional safety display control system 1 provided by some embodiments of the present disclosure can detect the permanent errors occurring during power-up and normal display through the fifth, sixth, and ninth functional safety detection units (i.e. Fusa05, Fusa06, and Fusa09), and can detect the permanent errors and the temporary errors in real time occurring in the circuit during normal display through the first, second, third, fourth, seventh and eighth functional safety detection units (i.e. Fusa01, Fusa02, Fusa03, Fusa04, Fusa07, Fusa08), and the tenth, eleventh, twelfth, thirteenth, and fourteenth functional safety detection units (i.e. Fusa10, Fusa11, Fusa12, Fusa13, Fusa14). In addition, the permanent errors and the temporary errors occurring in the functional safety display controller 12 are reported to the central controller 11 in the form of interrupts. An interrupt path detects and corrects the permanent errors and the temporary errors occurring in the circuit by the twelfth functional safety detection unit 12, so that the central controller 11 can obtain correct interrupt alarms.

In addition, in some embodiments of the present disclosure, the data bus between the functional safety display controller 12 and the memory 13 can detect random errors occurring in the data bus path through the fifth, tenth, eleventh, and twelfth functional safety detection units, i.e. Fusa05, Fusa10, Fusa11, and Fusa12. In these embodiments, the display data path between the functional safety display controller 12 and the display 14 can detect random errors occurring in the display data bus path through the fifth, sixth, and seventh functional safety detection units, i.e. Fusa05, Fusa06, Fusa07.

Based on the above description of the functional safety display control system, an embodiment of the present disclosure also provides the functional safety display controller. The functional safety display controller is communicatively connected to the central controller, the memory, and the display. At least one internal module of the functional safety display controller is provided with a functional safety detection unit, and the functional safety detection unit is configured to detect random errors that occur in a corresponding module. The functional safety display controller provided by an embodiment of the present disclosure can be implemented by using the structure and connection methods shown in FIGS. 1-3, and the present disclosure is not limited thereto.

In summary, in an embodiment of the present disclosure, the functional safety display controller is communicatively connected to the central controller, the memory, and the display, and the functional safety display controller, the central controller, the memory, and the display form the functional safety display control system. The functional safety display control system is in a form of hardware that complies with the ISO26262 standard and can balance issues such as research and development costs, risk control, and system area overhead. In addition, in some embodiments of the present disclosure, the functional safety display controller can adopt corresponding functional safety detection mechanism according to the function and type of the circuit, and its area overhead is controllable. Therefore, the functional safety display controller provided by the present disclosure is an inheritable and expandable solution. Furthermore, in some embodiments of the present disclosure, the functional safety display control system including the functional safety display controller, the central controller, the memory, and the display does not require software certification, and can detect and report random errors caused by electrical or electronic failures in circuits in real time. With higher real-time performance, safety, and reliability, it can greatly reduce product research and development costs, accelerate product research and development progress, and reduce development risks. Compared with ordinary display control systems, the functional safety display control system only needs 1.2~1.4 times the area overhead to detect more than 90% of circuit random errors. Therefore, the present disclosure overcomes the shortcomings of the prior art and has significant industrial value.

It should be understood that in the several embodiments provided by the present disclosure, the disclosed systems or devices can be implemented in other ways. For example, the above-described embodiments of systems or devices are only illustrative, for example, the division of modules/units is only a logical functional division, there may be other division methods in actual implementation, for example, multiple modules or units can be combined or integrated into another system, or some features can be ignored or not executed. In addition, the coupling or direct coupling or communication connection between each other shown or discussed above may be indirect coupling or communication connection adopting some interfaces, devices, or modules or units, or in electrical form, mechanical form, or other forms.

The modules/units described as separate components may or may not be physically separated, and the components displayed as modules/units may or may not be physical modules, i.e., they may be located in one place or distributed to multiple network units. Some or all of the modules/units can be selected according to actual needs to achieve the purpose of the embodiments of the present disclosure. For example, in each embodiment of the present disclosure, each functional module/unit can be integrated into a processing module, or each module/unit can physically exist separately, or two or more modules/units can be integrated into one module/unit.

Those skilled in the art should also be able to further realize that the units and algorithm steps described in the examples disclosed in the embodiments of the present disclosure can be implemented with electronic hardware, computer software, or a combination of both. In order to clearly illustrate the interchangeability of hardware and software, the components and steps of each example have been generally described according to functions in the above description. Whether these functions are executed in hardware or software depends on the specific application and design constraints of the technical solution. Skilled technicians can use different methods to implement the described functions for each specific application, but such implementation should not be considered beyond the scope of the present disclosure.

The above embodiments are illustrative of the principles and benefits of the disclosure rather than restrictive of the scope of the disclosure. Persons skilled in the art can make modifications and changes to the embodiments without departing from the spirit and scope of the disclosure. Therefore, all equivalent modifications and changes made by persons skilled in the art without departing from the spirit and technical concepts disclosed in the disclosure shall still be deemed falling within the scope of the claims of the disclosure.

What is claimed is:

1. A functional safety display controller, wherein the functional safety display controller is connected to a central controller, a memory, and a display through communication lines, wherein at least one internal module of the functional safety display controller is provided with a corresponding functional safety detection unit, and the functional safety detection unit is configured to detect random errors that occur in a corresponding module, wherein the functional safety display controller comprises a register parsing module, and the register parsing module is provided with a first functional safety detection unit and a second functional safety detection unit, wherein the first functional safety detection unit is configured to detect random errors occurring in interfaces of the central controller and the functional safety display controller, and detect random errors occurring in configuration data of the functional safety display controller and an internal use terminal, wherein the second functional safety detection unit is configured to detect random errors occurring in a control circuit between the central controller and the functional safety display controller.

2. The functional safety display controller according to claim 1, wherein the first functional safety detection unit detects the random errors occurring in the interfaces of the central controller and the functional safety display controller and detects the random errors occurring in the configuration data of the functional safety display controller and the internal use terminal by performing parity check on contents transmitted by a configuration bus, and/or wherein the second functional safety detection unit detects the random errors occurring in the control circuit between the central controller and the functional safety display controller by monitoring a timeout situation of the configuration bus.

3. The functional safety display controller according to claim 1, wherein the functional safety display controller comprises an image processing module, and the image processing module is provided with a third functional safety detection unit, a fourth functional safety detection unit, and a fifth functional safety detection unit, wherein the third functional safety detection unit is configured to detect random errors occurring in data information of pipelines inside the functional safety display controller, wherein the fourth functional safety detection unit is configured to detect random errors occurring in a combination circuit among the pipelines inside the functional safety display controller, wherein the fifth functional safety detection unit is configured to detect permanent circuit errors occurring in the functional safety display controller.

4. The functional safety display controller according to claim 3, wherein the third functional safety detection unit detects the random errors occurring in the data information of the pipelines inside the functional safety display controller by performing parity check on a timing circuit, and/or wherein the fourth functional safety detection unit detects the random errors occurring in the combination circuit among the pipelines inside the functional safety display controller by taking each stage of the pipeline as the smallest unit, and/or wherein the fifth functional safety detection unit detects the permanent circuit errors occurring in the functional safety display controller through a hardware test library.

5. The functional safety display controller according to claim 1, wherein the functional safety display controller comprises a display interface control module, and the display interface control module is provided with a sixth functional safety detection unit, a seventh functional safety detection unit, and an eighth functional safety detection unit, wherein the sixth functional safety detection unit is configured to detect permanent circuit errors occurring in the functional safety display controller, wherein the seventh functional safety detection unit is configured to detect random errors occurring in a pixel pipeline control circuit inside the functional safety display controller, wherein the eighth functional safety detection unit is configured to detect random errors occurring in display data between the functional safety display controller and the display.

6. The functional safety display controller according to claim 5, wherein the sixth functional safety detection unit detects the permanent circuit errors occurring in the functional safety display controller through a hardware test library, and/or wherein the seventh functional safety detection unit detects the random errors occurring in the pixel pipeline control circuit inside the functional safety display controller by monitoring the number of pixels, and/or wherein the eighth functional safety detection unit detects the random errors occurring in the display data between the functional safety display controller and the display by performing cyclic redundancy check encoding on pixel contents at a sending end.

7. The functional safety display controller according to claim 1, wherein the functional safety display controller comprises a memory access control module, and the memory access control module is provided with a ninth functional safety detection unit, a tenth functional safety detection unit, an eleventh functional safety detection unit, and a twelfth functional safety detection unit, wherein the ninth functional safety detection unit detects permanent circuit errors occurring in the functional safety display controller, wherein the tenth functional safety detection unit detects random errors occurring in a pixel transfer data path between the functional safety display controller and the memory, wherein the eleventh functional safety detection unit and the twelfth functional safety detection unit detect random errors occurring in a control path between the functional safety display controller and the memory.

8. The functional safety display controller according to claim 7, wherein the ninth functional safety detection unit detects the permanent circuit errors occurring in the functional safety display controller through a hardware test library; and/or wherein the tenth functional safety detection unit detects the random errors occurring in the pixel transfer data path between the functional safety display controller and the memory by performing cyclic redundancy check decoding on data contents of a data bus at a receiving end; and/or wherein the eleventh functional safety detection unit detects the random errors occurring in the control path between the functional safety display controller and the memory by monitoring a timeout situation of the data bus, and/or wherein the twelfth functional safety detection unit detects the random errors occurring in the control path between the functional safety display controller and the memory by monitoring a data bus protocol.

9. The functional safety display controller according to claim 1, wherein the functional safety display controller comprises an internal storage module, and the internal storage module is provided with a thirteenth functional safety detection unit, wherein the thirteenth functional safety detection unit is configured to detect circuit random errors occurring in the internal storage module.

10. The functional safety display controller according to claim 9, wherein the thirteenth functional safety detection unit detects the circuit random errors occurring in the internal storage module by using error correcting code.

11. The functional safety display controller according to claim 1, wherein the functional safety display controller comprises an interrupt control module, and permanent errors and/or temporary errors detected by the functional safety detection unit are reported to the central controller in a form of interrupts through the interrupt control module.

12. The functional safety display controller according to claim 11, wherein the interrupt control module comprises a fourteenth functional safety detection unit, wherein the fourteenth functional safety detection unit is configured to detect and correct circuit random errors occurring in a functional safety interrupt path.

13. The functional safety display controller according to claim 12, wherein the fourteenth functional safety detection unit detects and corrects the circuit random errors occurring in the functional safety interrupt path by using triple modular redundancy.

14. The functional safety display controller according to claim 1, wherein the functional safety detection unit is further configured to detect random errors occurring in a configuration bus between the functional safety display controller and the central controller, random errors occurring in an image data bus between the functional safety display controller and the memory, and/or random errors occurring in a display data bus between the functional safety display controller and the display.

15. A functional safety display control system, wherein the functional safety display control system comprises a central controller, a memory, a display, and the functional safety display controller according to claim 1.

\* \* \* \* \*